United States Patent
Yamanaka

(10) Patent No.: US 6,968,077 B1
(45) Date of Patent: Nov. 22, 2005

(54) IMAGE PROCESSING APPARATUS AND PROGRAM STORAGE MEDIUM

(75) Inventor: Takatoshi Yamanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/495,931

(22) Filed: Feb. 2, 2000

(30) Foreign Application Priority Data

May 25, 1999 (JP) ................................. 11-144651

(51) Int. Cl.[7] .............................................. G06K 9/00
(52) U.S. Cl. ...................... 382/128; 382/226; 382/240
(58) Field of Search .............................. 382/128, 132, 382/226, 227, 228, 224, 225, 240; 128/922; 250/455.11, 461.2, 491.1; 356/39; 377/10, 377/13; 358/1.16; 345/418

(56) References Cited

U.S. PATENT DOCUMENTS

| | | | | |
|---|---|---|---|---|
| 5,020,112 A | * | 5/1991 | Chou | 382/226 |
| 5,295,243 A | * | 3/1994 | Robertson et al. | 345/848 |
| 5,502,576 A | * | 3/1996 | Ramsay et al. | 358/444 |
| 5,627,554 A | * | 5/1997 | Jefferson | 345/5 |
| 5,712,964 A | * | 1/1998 | Kamada et al. | 345/418 |
| 5,898,430 A | * | 4/1999 | Matsuzawa et al. | 715/500.1 |
| 5,978,562 A | * | 11/1999 | Sako | 358/1.16 |
| 6,198,837 B1 | * | 3/2001 | Sasano et al. | 382/132 |
| 6,333,963 B1 | * | 12/2001 | Kaifu et al. | 378/98.2 |
| 6,456,405 B2 | * | 9/2002 | Horikoshi et al. | 359/9 |
| 2002/0109859 A1 | * | 8/2002 | Tipimeni | 358/1.15 |
| 2003/0002629 A1 | * | 1/2003 | Takasawa | 378/165 |

* cited by examiner

Primary Examiner—Bhavesh M. Mehta
Assistant Examiner—Barry Choobin
(74) Attorney, Agent, or Firm—Staas & Halsey LLP

(57) ABSTRACT

An image processing apparatus deals with a plurality of objects each having a pair of image data representative of an image and image attribute information representative of an attribute of the image, wherein the plurality of objects are linked in form of a hierarchy structure including a parentage. The image processing apparatus comprises object producing means for producing new objects upon succession of image attribute information of a parent object, object deleting means for deleting an object and the associated descendant objects as well, and attribute information altering means for altering an attribute of an object and an attribute of the associated descendant objects as well.

16 Claims, 13 Drawing Sheets

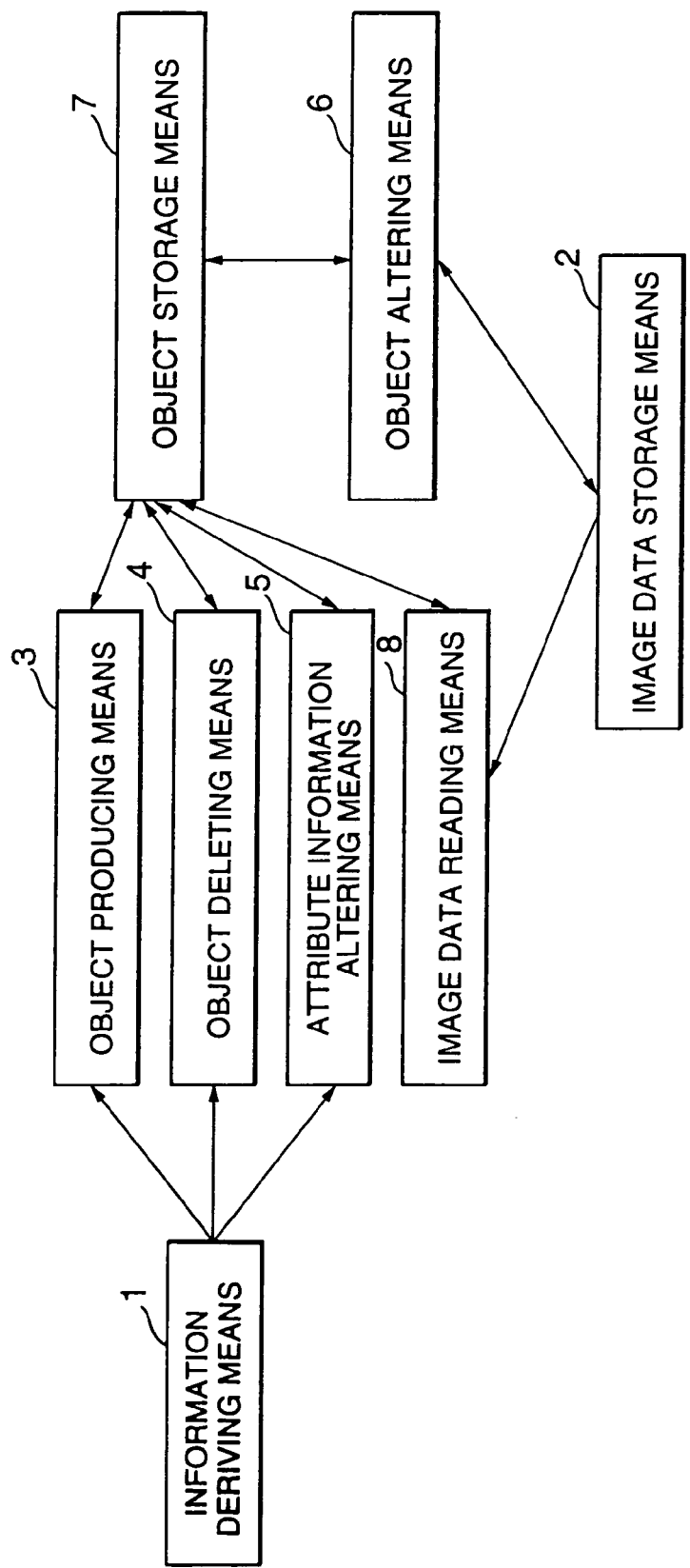

Fig.6

| |
|---|
| IMAGE SIZE (WIDTH, HEIGHT, BAND) INFORMATION |
| IMAGE ACCURACY (1, 4, 8, 24 BITS) INFORMATION |
| COMPRESSION (JPEG, Huffman, MH, MR, MMR, · · ·) INFORMATION |
| COMPRESSION SIZE INFORMATION |
| COMPRESSION LEVEL INFORMATION |
| COLOR SPACE (RGB, CMYK, YCbCr, · · ·) INFORMATION |
| COLOR PALETTE INFORMATION |
| PIXEL INTERPRETATION (Windows BMP FORM, NON-INTERLEAVE FORM, BYTE BOUNDARY PRESENCE) |
| DIGITAL DATA STORAGE DESTINATION (MEMORY OR FILE) |
| ROI (REGION-OF INTER NET) INFORMATION |
| PLATFORM (INTEL FORM, MOTOROLA FORM, · · ·) INFORMATION |
| ⁓ ⁓ |
| PATIENT INFORMATION (PATIENT ID, PATIENT NAME, SEX AGE, · · ·) |
| PHOTOGRAPHIC CONDITIONS (CAMERA TYPE NAME, PHOTOGRAPHIC SITE, PHOTOGRAPHIC SCHEME, · · ·) | ized
IMAGE PROCESSING APPARATUS AND PROGRAM STORAGE MEDIUM

BACKGROUND OF THE INVENTION

1. Field of the Invention

The present invention relates to an image processing apparatus and a program storage medium.

2. Description of the Related Art

Digital image data representative of an image such as a photograph may take various types of attribute contents with respect to the respective attributes such as an image size, image information, data format, etc. In connection with processing for such a type of image data, there is known an image processing apparatus for providing any sorts of processing for image data such as production, deletion and conversion of image data in accordance with the attribute contents. For example, in the event that there is a need that a size of an image to be displayed on a display is unified to a fixed size such as 320 pixels×240 pixels, there is used an image processing apparatus having a function of converting an image size so that the above-mentioned fixed size of image data is produced in accordance with a plurality of various sizes of image data prepared beforehand. Also, for example, in a computer which is poor in performance of a central processing unit (CPU), in order to make it easy that image data is dealt with, there is used an image processing apparatus having a function of converting an image definition of image data so that the image definition of image data is degraded from a full color to 256 colors, or in order to avoid pressure on a storage capacity by an image data, there is used an image processing apparatus having a function of converting a format of image data so that the data format of image data is converted from the TIFF to the jpeg which is higher in compressibility.

However, since the conventional image processing apparatus deals with image data involved in various attribute contents in connection with the above-mentioned various attributes, management and control for data necessary for the image data and processing of the image data are complicated or troublesome. Thus, particularly, in the event that a plurality of image data having various attribute contents are processed, there is desired an image processing apparatus capable of supporting management and control of data and performing an effective image processing.

SUMMARY OF THE INVENTION

In view of the foregoing, it is an object of the present invention to provide an image processing apparatus capable of performing an effective image processing, and a program storage medium.

To achieve the above-mentioned objects, the present invention provides a first image processing apparatus for dealing with objects in an object system consisting of a plurality of objects each having a pair of image data representative of an image and image attribute information representative of an attribute of the image, wherein the plurality of objects are linked in form of a hierarchy structure including a parentage, said image processing apparatus comprising:

object producing means for producing new objects, wherein when said object producing means produces new objects having a parent object, said object producing means sets up image attribute information of the parent object on the new objects now on production in form of a default.

According to the first image processing apparatus, image attribute information of the parent object is set up on the new objects having a parent object. This feature makes it possible to efficiently set up the image attribute information representative of an attribute of the image.

To achieve the above-mentioned objects, the present invention provides a second image processing apparatus for dealing with objects in an object system consisting of a plurality of objects each having a pair of image data representative of an image and image attribute information representative of an attribute of the image, wherein the plurality of objects are linked in form of a hierarchy structure including a parentage, said image processing apparatus comprising:

attribute altering means for altering image attribute information of existing objects, wherein when said attribute altering means alters image attribute information of an object having a descendant object, said attribute altering means causes image attribute information altered in image attribute information of an object to be altered to be reflected in the descendant object of the object to be altered.

According to the second image processing apparatus, image attribute information of an object is reflected in image attribute information of the descendant object of the object. This feature makes it possible to efficiently alter image attribute information of a plurality of objects particularly.

To achieve the above-mentioned objects, the present invention provides a third image processing apparatus for dealing with objects in an object system consisting of a plurality of objects each having a pair of image data representative of an image and image attribute information representative of an attribute of the image, wherein the plurality of objects are linked in form of a hierarchy structure including a parentage, said image processing apparatus comprising:

object deleting means for deleting existing objects, wherein when said object deleting means deletes an object having descendant objects, said object deleting means deletes also the descendant objects of an object to be deleted.

According to the third image processing apparatus, when the object deleting means deletes an object having descendant objects, the object deleting means deletes the descendant objects as well as the object. This feature makes it possible to efficiently delete image attribute information and image data included in a plurality of objects particularly.

To achieve the above-mentioned objects, the present invention provides a fourth image processing apparatus for performing an image processing including a production processing for an object having a pair of image data representative of an image and image attribute information representative of an attribute of the image, said image processing apparatus comprising:

storage means for storing image attribute information for a default; and object producing means for producing objects, wherein said object producing means sets up image attribute information stored in said storage means on an object now on production in form of a default.

According to the fourth image processing apparatus, the object producing means sets up a predetermined image attribute information on an object now on production in form of a default. This feature makes it possible to efficiently set up image attribute information representative of an attribute of the image data.

Here, with respect to all the first to fourth image processing apparatus, it is acceptable that the image processing apparatus deals with a medical image, and it is preferable that the image attribute information includes patient information and photographic condition.

It is acceptable that the image processing apparatus of the present invention is used as an image processing apparatus dealing with a medical image.

To achieve the above-mentioned objects, the present invention provides a first program storage medium loaded onto a computer system for storing an image processing program for causing said computer system to operate as an image processing apparatus for dealing with objects in an object system consisting of a plurality of objects each having a pair of image data representative of an image and image attribute information representative of an attribute of the image, wherein the plurality of objects are linked in form of a hierarchy structure including a parentage, said image processing program comprising:

object producing means for producing new objects, wherein when said object producing means produces new objects having a parent object, said object producing means sets up image attribute information of the parent object on the new objects now on production in form of a default.

To achieve the above-mentioned objects, the present invention provides a second program storage medium loaded onto a computer system for storing an image processing program for causing said computer system to operate as an image processing apparatus for dealing with objects in an object system consisting of a plurality of objects each having a pair of image data representative of an image and image attribute information representative of an attribute of the image, wherein the plurality of objects are linked in form of a hierarchy structure including a parentage, said image processing program comprising:

attribute altering means for altering image attribute information of existing objects, wherein when said attribute altering means alters image attribute information of an object having a descendant object, said attribute altering means causes image attribute information altered in image attribute information of an object to be altered to be reflected in the descendant object of the object to be altered.

To achieve the above-mentioned objects, the present invention provides a third program storage medium loaded onto a computer system for storing an image processing program for causing said computer system to operate as an image processing apparatus for dealing with objects in an object system consisting of a plurality of objects each having a pair of image data representative of an image and image attribute information representative of an attribute of the image, wherein the plurality of objects are linked in form of a hierarchy structure including a parentage, said image processing program comprising:

object deleting means for deleting existing objects, wherein when said object deleting means deletes an object having descendant objects, said object deleting means deletes also the descendant objects of an object to be deleted.

To achieve the above-mentioned objects, the present invention provides a fourth program storage medium loaded onto a computer system for storing an image processing program for causing said computer system to operate as an image processing apparatus for dealing with objects in an object system consisting of a plurality of objects each having a pair of image data representative of an image and image attribute information representative of an attribute of the image, wherein the plurality of objects are linked in form of a hierarchy structure including a parentage, said image processing program comprising:

object producing means for producing objects, wherein said object producing means sets up a predetermined image attribute information on an object now on production in form of a default.

Here, it is acceptable that the image processing program stored in any of the first to fourth program storage media is adopted as an image processing program which deals with a medical image.

The first to fourth program storage media of the present invention as mentioned above have the same effects as the first to fourth image processing apparatuses of the present invention, respectively. While the same names are applied to the structural elements in the image processing apparatus and the program storage medium, the apparatus implies one constructed in a hardware or another in which a software is incorporated into a hardware, for example, a wide use of computer, so that a function as the image processing apparatus of the present invention is implemented, and the program implies a software per se.

BRIEF DESCRIPTION OF THE DRAWINGS

FIG. 2 is a conceptual view of the image processing apparatus shown in FIG. 1(A).

FIG. 6 is a view showing an example of resource information of an object.

DETAILED DESCRIPTION OF PREFERRED EMBODIMENTS

Hereinafter, there will be described embodiments of the present invention.

Figure 1A:
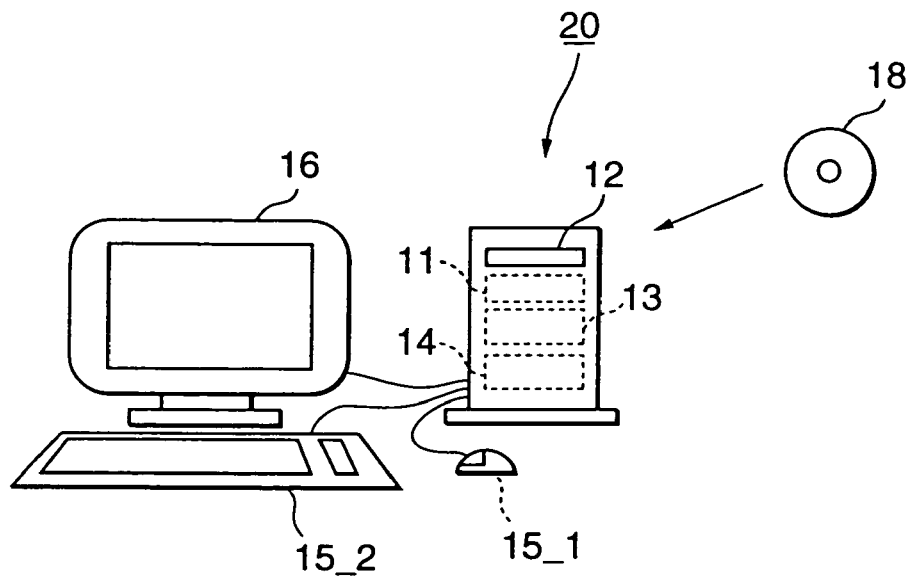
FIGS. 1(A) and 1(B) are a perspective view and an internal structural view of a computer in which an embodiment of an image processing apparatus according to the present invention is implemented, respectively.
Figure 1B:
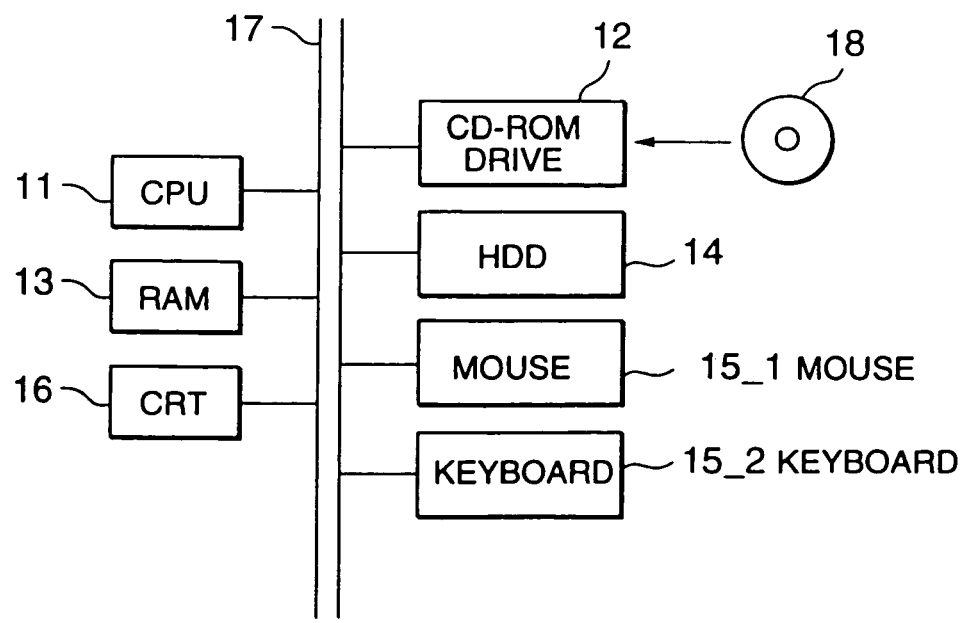

FIGS. 1(A) and 1(B) are a perspective view and an internal structural view of a computer in which an embodiment of an image processing apparatus according to the present invention is implemented, respectively.

As shown in FIGS. 1(A) and 1(B), a computer 20 has a function of the usual GUI (graphic user interface), in which a CPU 11, a CD-ROM drive 12, a memory 13, a hard disk 14, a mouse 15_1, a keyboard 15_2 and a display 16 are connected with one another via a system bus 17. When a CD-ROM 18, which stores a program used in an image processing apparatus of the present invention, is inserted into the CD-ROM drive 12 of the computer 20, and the program is installed onto the hard disk 14, the image processing apparatus becomes an operative state. When the installed program is activated, the computer system is operated in form of an embodiment of an image processing apparatus of the present invention.

Consequently, the CD-ROM 18, which stores the image processing program, corresponds to an embodiment of a program storage medium of the present invention.

Incidentally, according to the computer 20 shown in FIG. 20, the CD-ROM 18 is used as a program storage medium for storing the above-mentioned program. However, the program storage medium of the present invention is not restricted to the CD-ROM, but includes a program storage medium such as an optical disk, an optical magnetic disk, a floppy disk, and a magnetic tape, and also an internal storage device such as a hard disk device which is in a state that the above-mentioned program is installed. The program storage medium, which is in a state storing an image processing program, also corresponds to an embodiment of a program storage medium of the present invention.

FIG. 2 is a conceptual view of the image processing apparatus shown in FIG. 1(A).

An image processing apparatus 10 comprises information deriving means 1, image data storage means 2, object producing means 3, object deleting means 4, attribute information altering means 5, object altering means 6, object storage means 7 and image data reading means 8.

Before explaining details of the conceptual structure of the image processing apparatus 10, there will be described an image processing and an object hereinafter.

The image processing implies that digital image data representative of images such as photograph and the like is processed. The digital image data is varied in attribute in accordance with a combination of various types of processing. A list of attributes characterizing the digital image data is provided in form of image attribute information.

Figure 3:
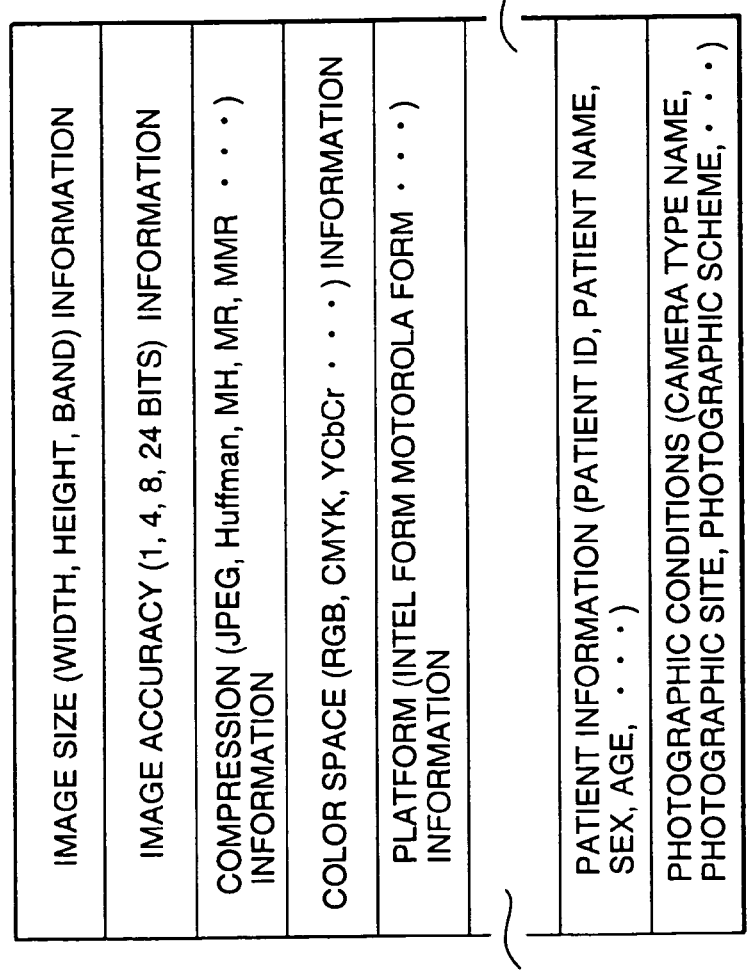
FIG. 3 is a view showing a sort of attributes included in image attribute information.

FIG. 3 is a view showing a sort of attributes included in the image attribute information.

The image attribute information includes various sorts of attribute information, such as image size information indicative of a size of an image, for example, 320 pixels×240 pixels, image accuracy information indicative of accuracy of color of an image, for example, 256 colors (8 bit) and full colors (24 bits), compression scheme information indicative of a compression scheme such as a jpeg, color space information indicative of a sort of a color space in accordance with which a color is defined, for example, RGB and CMYK, and platform information indicative of a sort of a platform such as Intel form and Motorola form.

Here, there is dealt with a medical use image (for example, an image of a human body or a part thereof, which is obtained by a medical equipment such as an X-ray photographic apparatus, an MRI, an ultrasonic diagnostic apparatus, a gastrocamera, a fiberscope, etc., and an image (an electrocardiogram, brain waves, etc.) representative of data derived from a human body or a part thereof). The image attribute information includes patient information (a patient ID, a patient name, sex, age, a past illness, etc.), and photographic conditions (a camera type name, a photographic site (for example, the head, the chest, the abdomen, etc.), and a photographic scheme (a front simple indirect photography, a side simple direct photography, etc.)), which characterize the medical use image.

Figure 4:
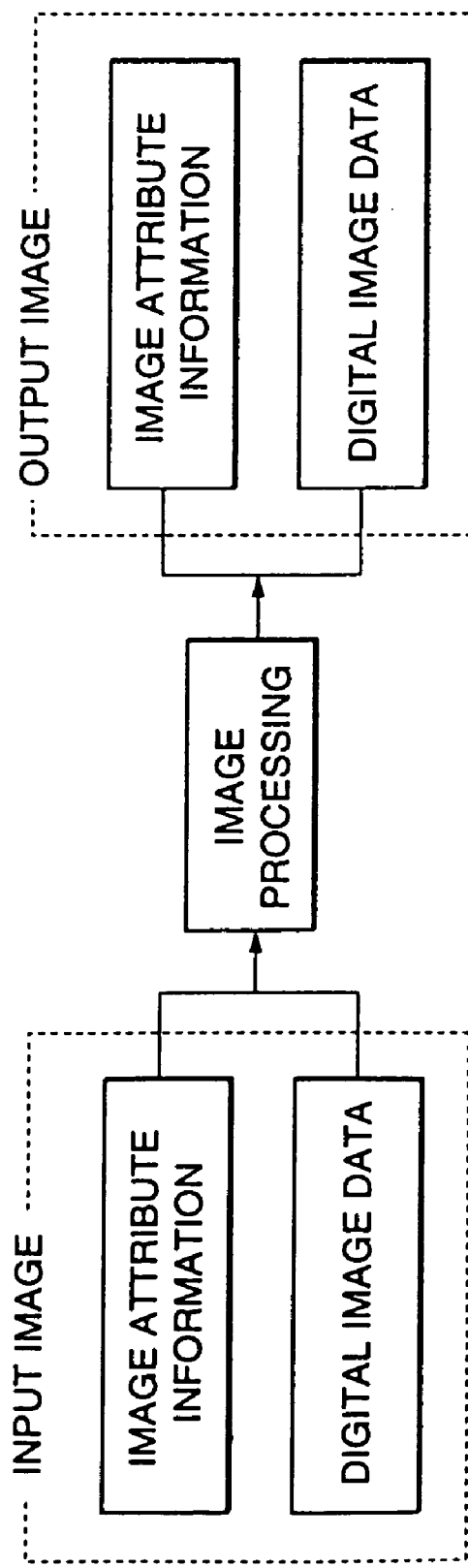
FIG. 4 is a view showing a state that an attribute of digital image data is altered in accordance with the conventional image processing apparatus.

FIG. 4 is a view showing a state that an attribute of digital image data is altered in accordance with the conventional image processing apparatus.

As shown in FIG. 4, in the event that an attribute of digital image data is altered, image attribute information, which is set up in accordance with an analysis of the digital image data, is used. According to the digital image data, a storage destination is managed and the storage destination is associated with a predetermined image attribute information. Further, in the event that an attribute of the digital image data is converted, there is a need to manage information as to the respective data formats such as TIFF, JPEG, DICOM, PNG, and information as to the respective platforms. The digital image data is controlled in accordance with those kinds of information and is subjected to an image processing, so that it is converted into digital image data having a new attribute and image attribute information.

As in the attribute conversion of the digital image data, it is necessary for the image processing to provide complicated and troublesome management and control according to the various types of attribute contents. However, according to the image processing apparatus of the present embodiment, as will be described hereinafter, an object having a pair of digital image data and image attribute information is dealt with in form of a basic unit of an image processing. This feature make it possible that the above-mentioned management and control are supported whereby the image processing is effectively performed.

Next, there will be described a structure of one object in conjunction with FIG. 5 referring to FIGS. 6 to 8.

Figure 5:
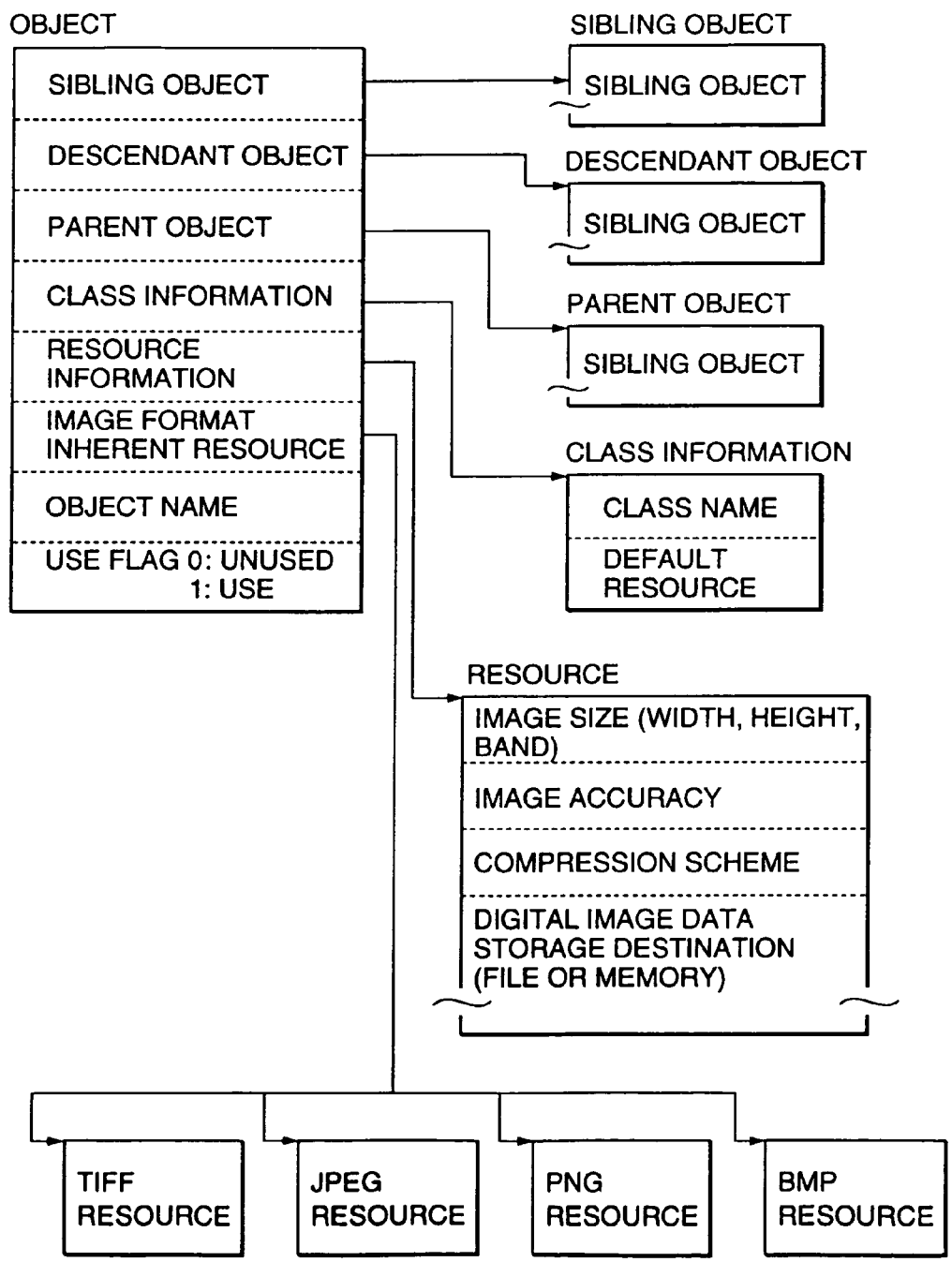
FIG. 5 is a view showing a structure of an object.

FIG. 5 is a view showing a structure of an object.

As shown in FIG. 5, an object is linked with resource information representative of digital image information and image attribute information. Details of the resource information is shown in FIG. 6.

FIG. 6 is a view showing an example of resource information of an object.

The resource information includes information as to a storage destination of digital image data. The digital image data to be stored in the storage destination corresponds to digital image data involved in the object. The resource information includes, of the image attribute information, for example, image size information, image accuracy information, compression scheme information, color space information, platform information, patient information, and photographic conditions. The resource information causes the image attribute information to be associated with digital image data.

An object is classified so as to belong to a group having the same property referred to as a class.

Figure 7:
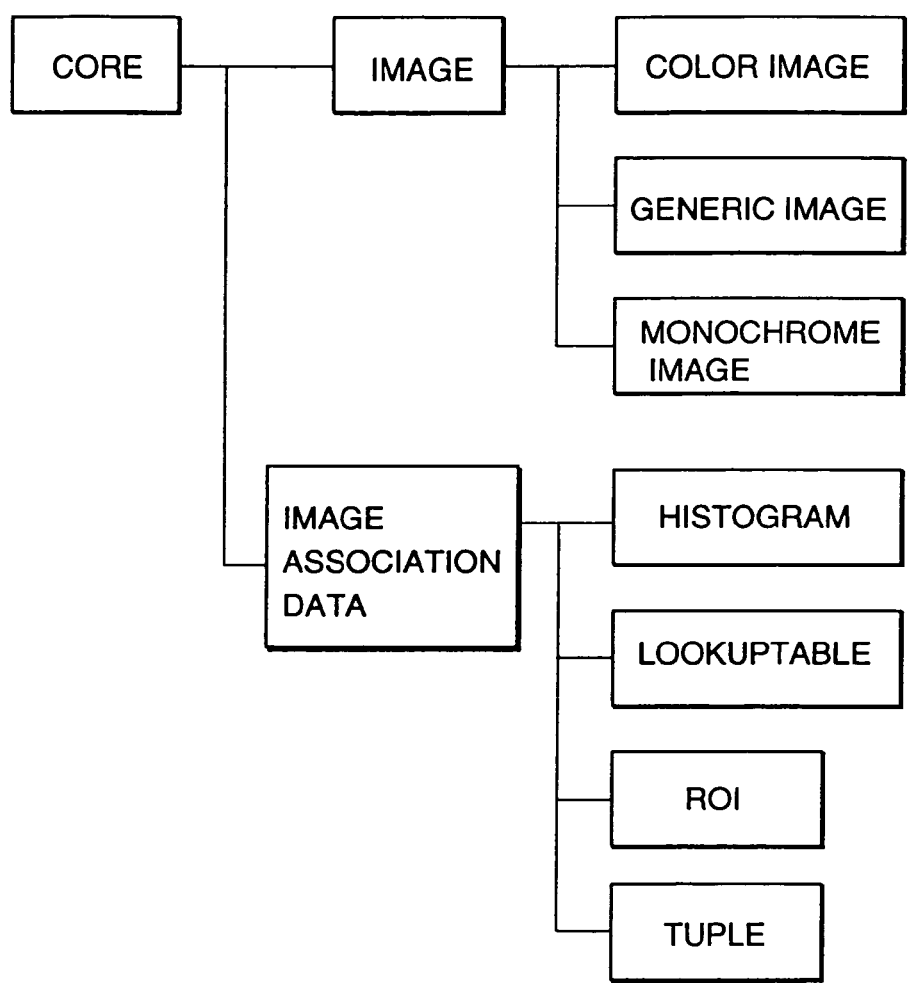
FIG. 7 is a view showing an example of classification of classes of an object.

FIG. 7 is a view showing an example of classification of classes of an object.

As shown in FIG. 7, the classes take a hierarchical structure. Here, the hierarchical structure has a "core class" which is a most significant hierarchy of class. As a class of a lower rank of hierarchy of the "core class", the hierarchical structure has an "image class" which is a class of an object related to an image per se, and an "image association data class" which includes a histogram, a lookup table, etc. As a class of a lower rank of hierarchy of the "image class", the hierarchical structure has a "color image class", a "generic image class" and a "monochrome image class".

In the event that a class, to which an object belongs, is varied, it is acceptable that a sort of attribute of image attribute information included in resource information of the object is varied. However, in accordance with this class of hierarchical structure, a class of a lower rank of hierarchy succeeds to the resource of a class of an upper rank of hierarchy. In other word, a sort of attribute possessed by image attribute information of resource information of a class of a lower rank of hierarchy includes a sort of attribute possessed by image attribute information of resource information of a class of an upper rank of hierarchy.

As shown in FIG. 5, an object is linked with class information which is information as to this class. The class information has a class name and a default resource which is a default for resource information to an object belonging to the class.

Further, as shown in FIG. 5, an object is linked with an image format inherent resource representative of information of data format, such as TIFF, JPEG, DICOM, and PNG, which are used for a control of attribute conversion of the digital image data, as described in conjunction with an explanation of FIG. 4.

With respect to an object, a parentage with another object is established in accordance with an operation of the exterior. It is noted that the parentage of the object referred to here does not mean a parentage of a class of an object, as known in general, but means a parentage of an instance of an object. This parentage is generally established between a plurality of objects belonging to the same class. When the parentage is established between the objects, in the event that an object A has at least one descendant object, contents of at least one attribute of resource information of the object A are succeeded to the descendant object so that the descendant object has the same contents of attribute as those of the object A in connection with the resource information. The object A is a parent object for the descendant objects. For an object B of the descendant objects, the remaining descendant objects but the object B of the object A are sibling objects. With respect to the objects, the parent object, the descendant objects and the sibling objects are linked together.

An object has an object name for identifying the object and in addition information indicative of a state of usage of a flag. The flag "1" denotes that the object is now used. Hereinafter, set up of the flag to "1" is referred to as set up of the flag to "use". In the event that the flag is established to "0", it is regarded as being unused, even if the object has information such as resource information. Hereinafter, set up of the flag to "0" is referred to as set up of the flag to "unused".

Figure 8:
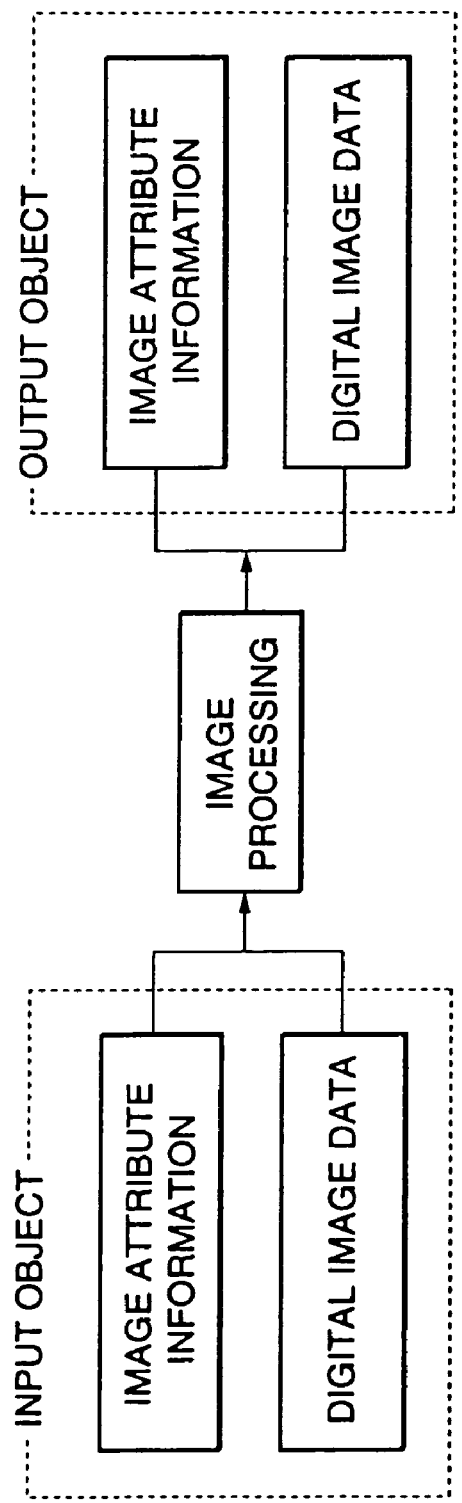
FIG. 8 is a view showing a state that an attribute of digital image data is altered in accordance with an image processing apparatus of the present embodiment.

FIG. 8 is a view showing a state that an attribute of digital image data is altered in accordance with an image processing apparatus of the present embodiment.

FIG. 8 is different from FIG. 4 in the point that the digital image data and the image attribute information are circled with a solid line of box. The solid line of box denotes an object. This object is already set up in the image attribute information, and includes a storage destination of the digital image data, so that the image attribute information is associated with the storage destination of the digital image data. Further this object is linked with information as to the contents of data formats such as TIFF, JPEG, DICOM, PNG, and information as to the respective platforms. While details of the attribute alteration of the digital image data will be described latter, according to the image processing apparatus of the present embodiment, the attribute alteration of the digital image data is performed in unit of an object by means of referring to information prepared inside the above-mentioned object. According to the image processing apparatus of the present embodiment, in the event that a software form is given, the object as mentioned above is adopted. Thus, the image processing apparatus of the present embodiment has such an advantage that it is excellent in maintenance and expansion of a program involved in the general object-oriented programming.

Now the explanation returns to FIG. 2 which is a conceptual view of the image processing apparatus 10 using the object as mentioned above.

For production and deletion of an object, and an alteration of image attribution information included in resource information, the information deriving means 1 generates in response to an operation of a user information such as an object name of interest, a class name, a parent object name, and contents of attribute of resource information.

The image data storage means 2 stores a plurality of digital image data. The object storage means 7 stores a plurality of objects.

The object producing means 3 performs set up of an object name of interest, a class name, a parent object name, and resource information to produce an object. The object thus produced is stored in the object storage means 7.

The object deleting means 4 reads from the object storage means 7 the object of the object name to be deleted which is derived from the information deriving means 1, and sets up a flag of the object to the "unused". The object set to the "unused" is stored in the object storage means 7. Incidentally, the object deleting means 4 may delete the object of the object name to be deleted in accordance with an operation of a user.

The attribute information altering means 5 reads from the object storage means 7 the object to be altered in attribute, which has the object name derived from the information deriving means 1, and replaces a predetermined attribute content of resource information of the object by a new attribute content derived from the information deriving means 1. The object replaced by the new attribute content is stored in the object storage means 7.

The image data reading means 8 derives an object name and image data from the information deriving means 1 in accordance with an operation of a user, and reads the object having the object name thus derived from the object storage means 7, and further reads digital image data having the image data name for the image data storage means 2 to analyze an attribute of the digital image data, so that the analyzed attribute content and a storage destination of the digital image data are applied to resource information of the object thus read. In this manner, the object altered in resource information is stored in the object storage means 7.

The object altering means 6 reads from the object storage means 7 an object A having digital image data A and an object B having no digital image data to generate digital image data B in which the digital image data of the object A is altered in accordance with image attribute information of the object B, so that the object B is altered to an object having digital image data B. The object B thus altered is stored in the object storage means 7.

Next, there will be described details of an object production, an object deletion and an alteration of attribute contents of an object referring to a flowchart hereinafter.

Figure 9:
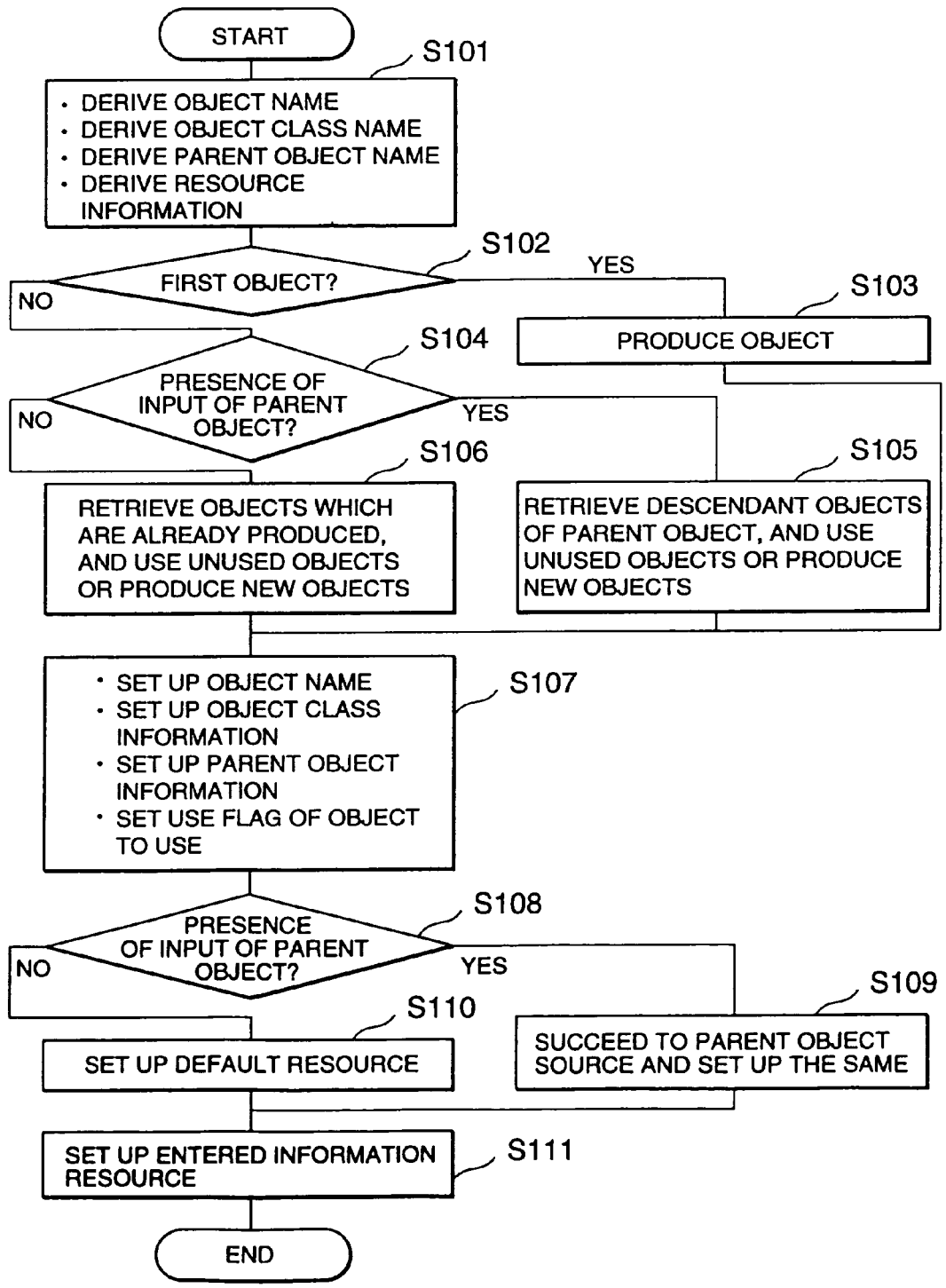
FIG. 9 is a flowchart useful for understanding a production of an object.

FIG. 9 is a flowchart useful for understanding a production of an object.

In step S101, the information deriving means 1 derives a name of an object entered through an operation of a user, and a class name of the object. Further, in the event that a name of a parent object is entered through an operation of a user, the information deriving means 1 derives the name of the parent object. And in the event that resource information is entered through an operation of a user, the information deriving means 1 derives the resource information. The resource information may be information as to a part of various attributes included in the resource information. Next, the process goes to steps S102 to S106.

In steps S102 to S106, the object producing means 3 retrieves the object storage means 7, and produces a new object when it is decided that an object to be produced is a first object. However, at this stage, the object does not include concrete contents of various kinds of information as shown in FIG. 5.

In the event that the name of the parent object is derived from the information deriving means 1, the object producing means 3 retrieves descendant objects having the name of the parent object from the object storage means 7. In the event that of the retrieved descendant objects, there is one which is associated with a flag of the "unused", the descendant object associated with the flag of the "unused" is used as the object to be produced. In the event that the object having the name of the parent object derived, of the object storage means 7, has no descendant object, or in the event that even if the object having the name of the parent object derived, of the object storage means 7, has descendant objects, all the descendant objects are associated with the flag of the "use", the object producing means 3 produces descendant objects having a name of a parent object newly derived.

Further, in the event that the object to be produced is not the first object and a name of a parent object is not derived from the information deriving means 1, the object producing means 3 retrieves the objects stored in the object storage means 7, and finds out an object involved in the flag of the "unused" from among the retrieved objects so as to use the same as an object to be produced. However, in the event that there exists no object having the flag of the "unused" in the retrieved objects, the object producing means 3 produces a new object. Then, the process goes to a step S107.

In the step S107, the object producing means 3 sets up the object name derived from the information deriving means 1 for the object produced in the steps S102 to S106, and reads from the object storage means 7 an object associated with the class name derived from the information deriving means 1 to set up class information of the object thus read. Further, the object producing means 3 links an object of the parent object name derived from the information deriving means 1, which is stored in the object storage means 7, with an object to be produced, and sets up the flag of the object to be produced to the "use". Then the process goes to steps 108 to 110.

In the steps 108 to 110, in the event that the parent object name is not derived from the information deriving means 1, the object producing means 3 sets up, as resource information, a default resource of the class information of the object to be produced. The object thus set up in the resource information has the same contents of resource information as the default resource.

In this manner, the image processing apparatus has the resource information for the default resource according to the class to which the object to be produced belongs, and sets up the resource information to the object in form of the resource information of the default. This feature makes it possible to effectively set up the resource information whereby the object is effectively produced.

On the other hand, in the event that the parent object name is derived from the information deriving means 1, the object producing means 3 succeeds to resource information of the object of the parent object name and sets up, as a default, the resource information to the object to be produced. The object thus set up in the resource information has the same contents of resource information as the resource information.

In this manner, the image processing apparatus sets up the resource information of the parent object to the object having the parent object in form of the resource information of the default. This feature makes it possible to effectively set up the resource information whereby the object is effectively produced.

The process goes to a step S111.

In the step S111, in the event that resource information is derived from the information deriving means 1, the resource information set up in the steps S108 to S110 is partially or completely replaced by the derived resource information. Thus, the production of the object is completed.

Figure 10:
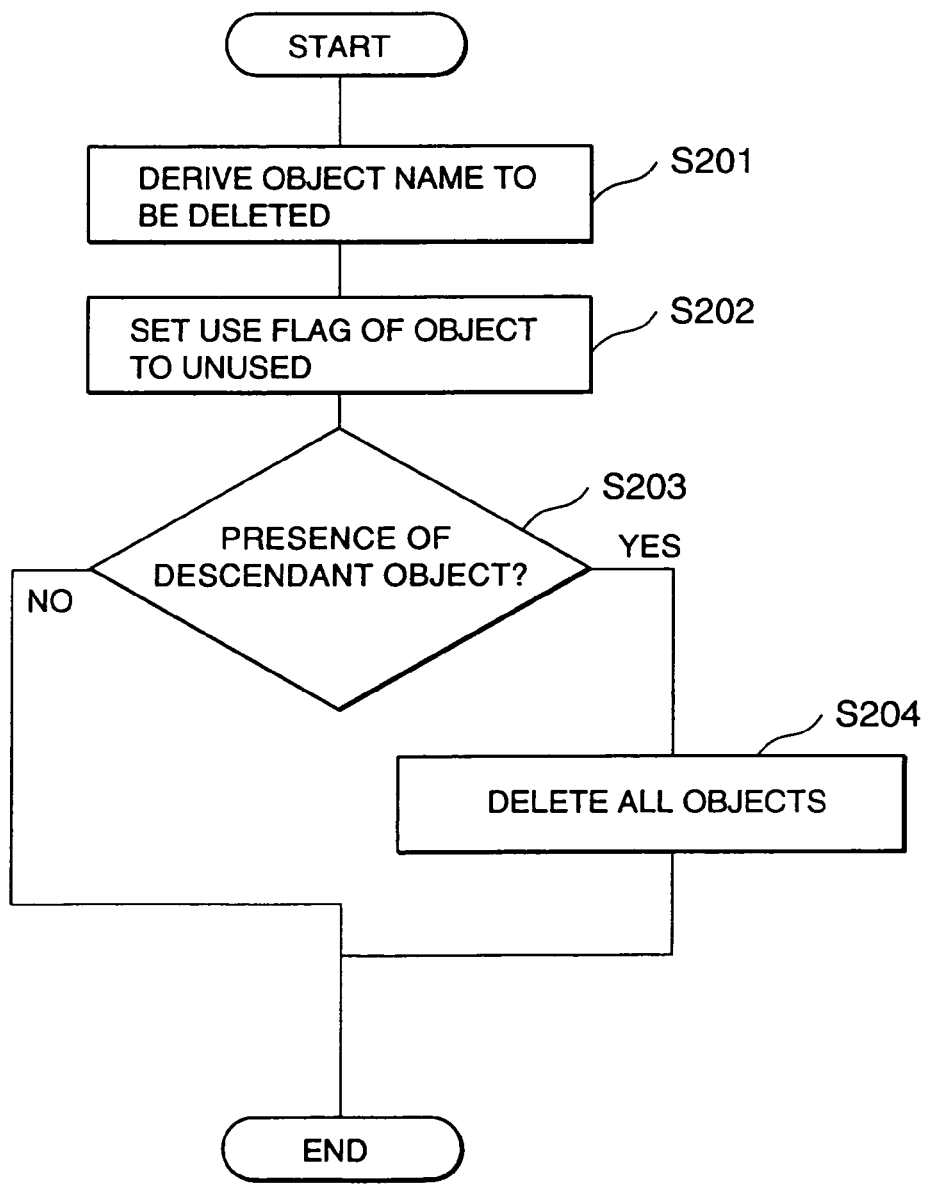
FIG. 10 is a flowchart useful for understanding a deletion of an object.

FIG. 10 is a flowchart useful for understanding a deletion of an object.

In step S201, the information deriving means 1 derives a name of an object to be deleted, which is entered through an operation of a user, and the object deleting means 4 reads the object of the object name from the object storage means 7. Next, the process goes to step S202.

In the step S202, the object deleting means 4 alters the use flag of the object thus read to the "unused". Next, the process goes to steps S203 to S204.

In the steps S203 to S204, the object deleting means 4 determines whether an object to be deleted involves descendant objects. When it is decided that the object to be deleted involves descendant objects, the use flag of all the descendant objects is altered to the "unused".

Thus, the deletion of the object is completed.

In this manner, the image processing apparatus of the present embodiment deletes an object and the associated descendant objects together. This feature makes it possible to efficiently delete the plurality of objects together with image attribute information and image data included in their objects.

Figure 11:
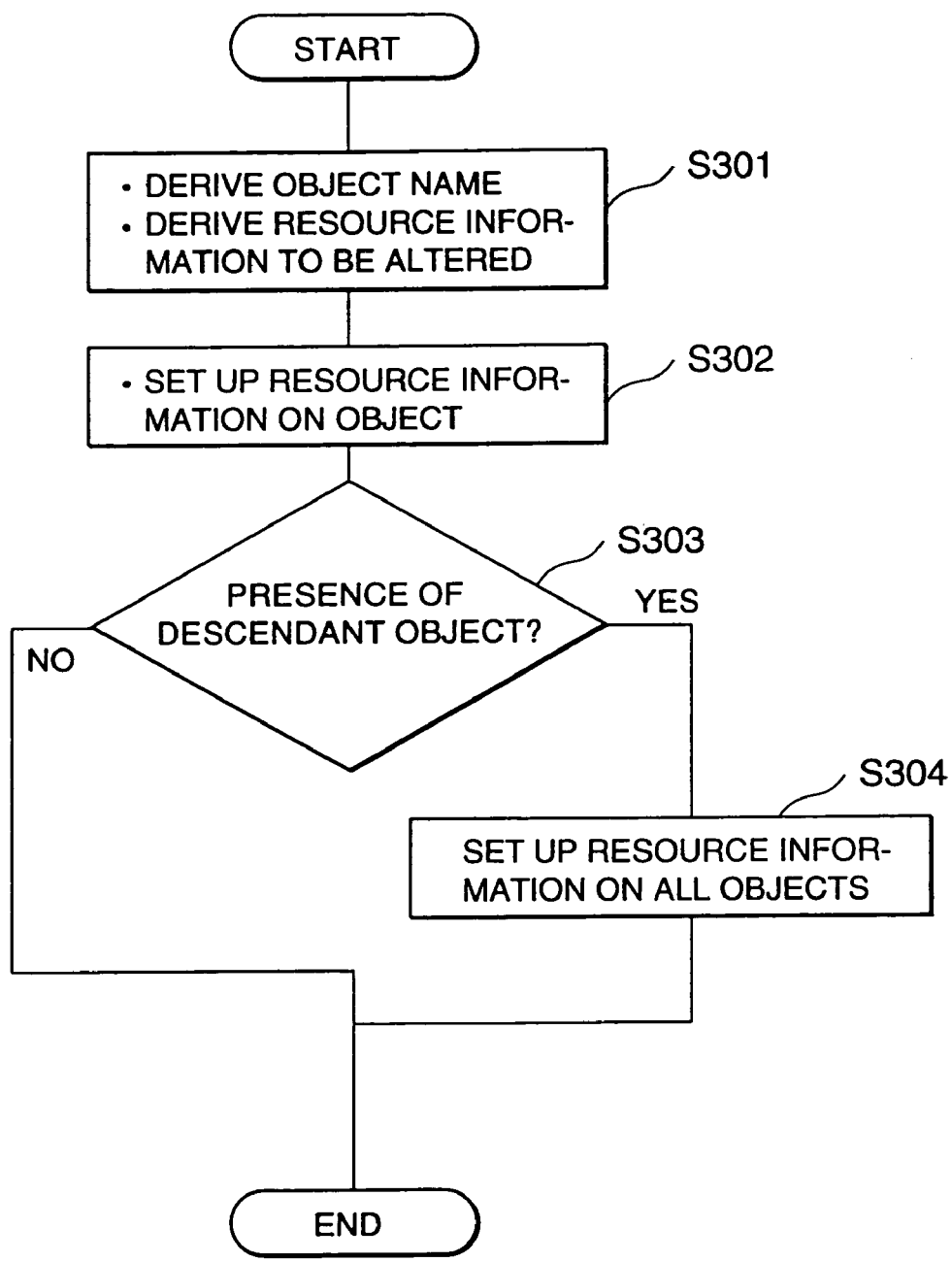
FIG. 11 is a flowchart useful for understanding an alteration of attribute contents of an object.

FIG. 11 is a flowchart useful for understanding an alteration of attribute contents of an object.

In step S301, the information deriving means 1 derives a name of an object to be altered in attribute, which is entered through an operation of a user, and the attribute information altering means 5 reads the object of the object name from the object storage means 7. Further, the information deriving means 1 derives resource information including new attribute contents, which is entered through an operation of a user. Next, the process goes to step S302.

In the step S302, the attribute information altering means 5 replaces only part corresponding to the above-mentioned new attribute contents of the resource information of the object to be altered in attribute read from the object storage means 7 by the new attribute contents. Next, the process goes to steps S303 to S304.

In the steps S303 to S304, the attribute information altering means 5 determines whether an object to be altered in attribute involves descendant objects. When it is decided that the object to be altered in attribute involves descendant objects, the attribute information altering means 5 reads from the object storage means 7 the descendant objects of the object to be altered in attribute, and replaces resource information of all the descendant objects by resource information including the above-mentioned new attribute information in a similar fashion to that of the step S302.

Thus, the alteration of attribute contents of the object is completed.

In this manner, the image processing apparatus of the present embodiment reflects image attribute information of an object on image attribute information of the associated descendant objects. This feature makes it possible, particularly for a plurality of objects, to efficiently alter image attribute information of the plurality of objects.

Next, there will be described an example in which a size of digital image data is converted utilizing the above-mentioned object production. Here, it is assumed that the image processing apparatus of the present embodiment reads a plurality of images having various data formats and various image sizes, and performs a conversion processing for all the images to the same image size on a batch basis.

Figure 12:
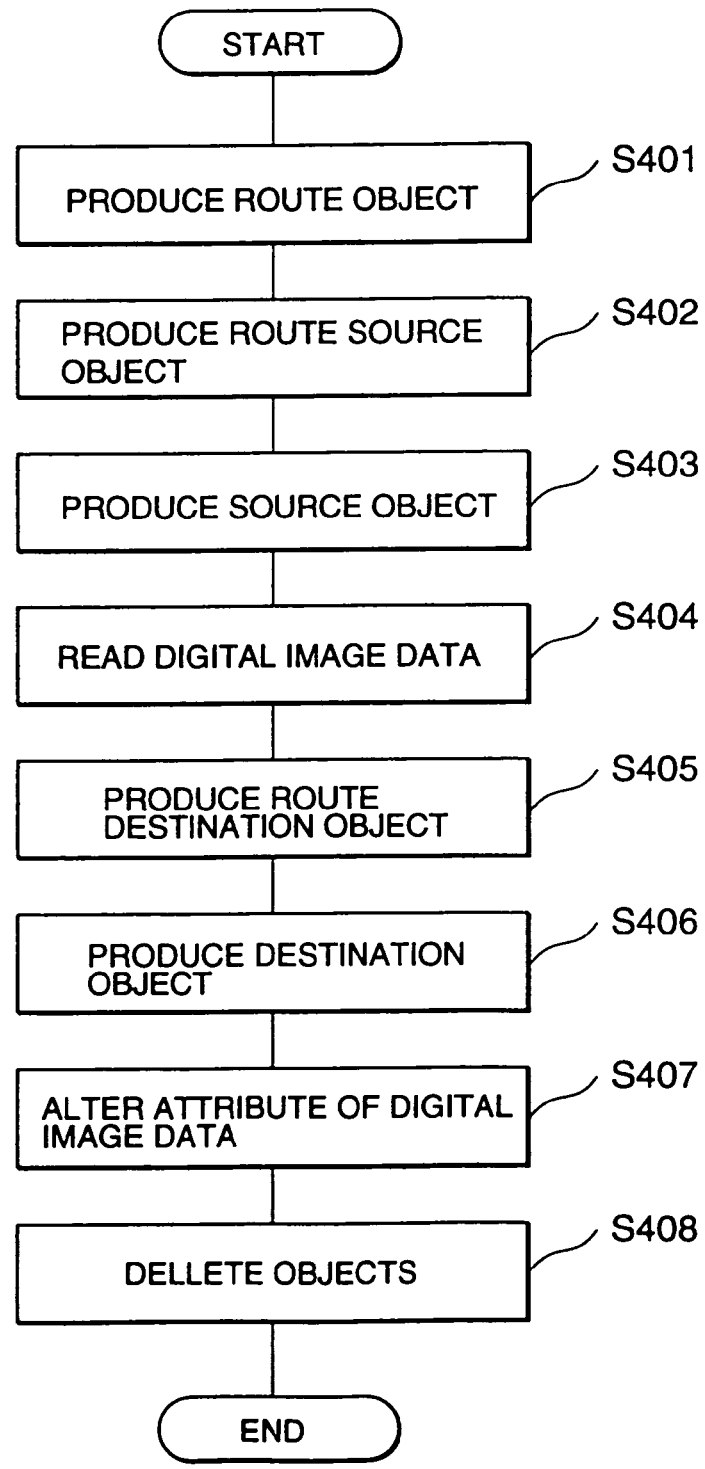
FIG. 12 is a flowchart useful for understanding an alteration of sizes of images of a plurality of objects.
Figure 13:
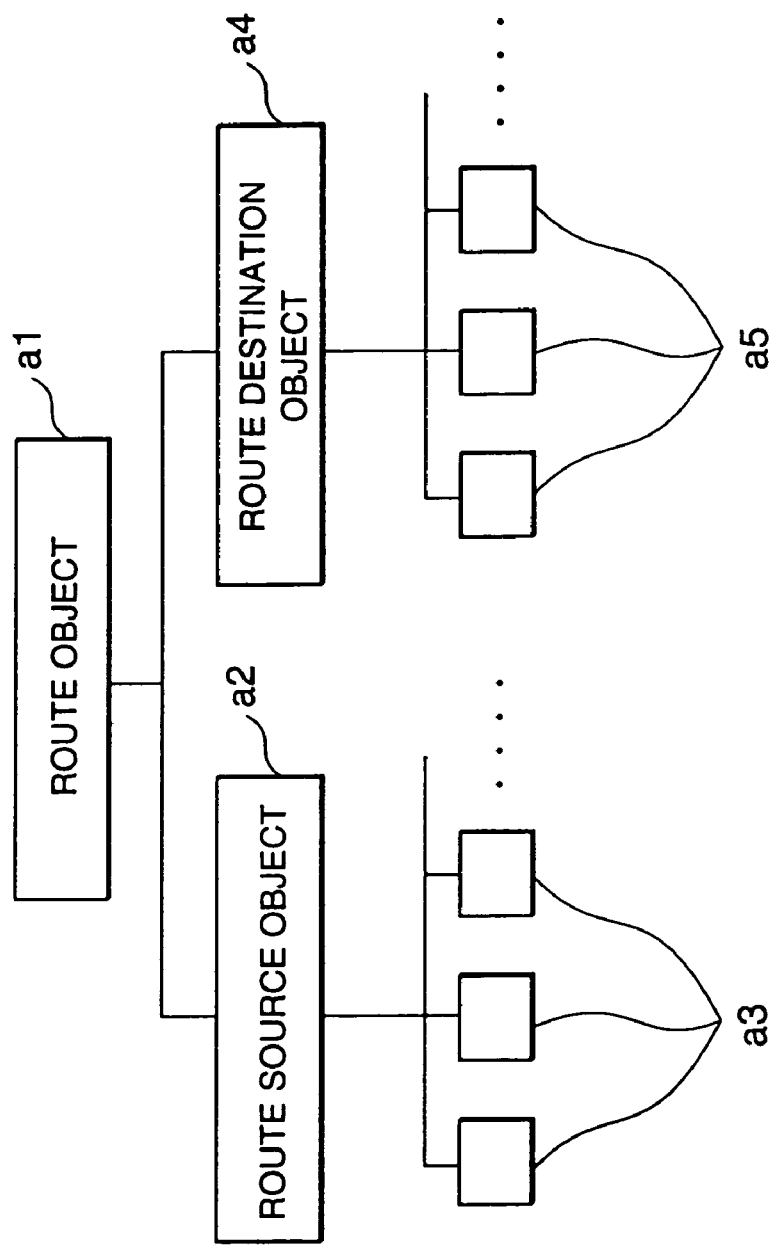
FIG. 13 is a view showing a hierarchical structure of a parentage of the objects used in the flowchart of FIG. 12.

FIG. 12 is a flowchart useful for understanding an alteration of sizes of images of a plurality of objects. FIG. 13 is a view showing a hierarchical structure of a parentage of the objects used in the flowchart of FIG. 12.

As shown in FIG. 12, in step S401, the object producing means 3 produces a route object a1 shown in FIG. 13. The route object a1 has no parent object and is set to belong to a general image class. As resource information, the default resource of the general image class is set up. Incidentally, all the objects used in this flowchart are set to belong to the general image class. Next, the process goes, to step S402.

In the step S402, the object producing means 3 produces a route source object a2, as shown in FIG. 13, which is a parent object of objects having a plurality of images of the various data formats and the various image sizes. With respect to the route source object a2, the route object a1 is set up as a parent object. Resource information of the route source object a2 succeeds to resource information of the parent object. Incidentally, the respective resource information of the following objects succeeds to resource information of the respective parents, unless it is noted. Next, the process goes to step S403.

In the step S403, the object producing means 3 produces source objects a3, as shown in FIG. 13, which are basic objects for reading a plurality of images of the various data formats and the various image sizes, by a predetermined number of images. With respect to the source objects a3, the route source object a2 is set up as a parent object. Next, the process goes to step S404.

In the step S404, the image data reading means 8 reads a plurality of digital image data of the various data formats and the various image sizes from the image data storage means 2 to the source objects a3. Thus, the digital image data are read so that the image data reading means 8 sets up image attribute information of the digital image data thus read to image attribute information of resource information of the source objects a3. Next, the process goes to step S405.

In the step S405, the object producing means 3 produces a route destination object a4, as shown in FIG. 13, which is a parent object of a plurality of digital image data of the same image size. With respect to the route destination object a4, the route object a1 is set up as a parent object. Image size of image attribute information included in resource information of the route destination object a4 is set up to 320 pixels×240 pixels, and resource information other than the image size succeeds to resource information of the parent object. Next, the process goes to step S406.

In the step S406, the object producing means 3 produces destination objects a5, as shown in FIG. 13, which are basic objects for reading a plurality of digital image data of the same image sizes, by the same numbers as the plurality of digital image data. With respect to the destination objects a5, the route destination object a4 is set up as a parent object. Next, the process goes to step S407.

In the step S407, the object altering means 6 sequentially reads a pair of objects in which the respective destination object a5 is associated with the source object, the pair of objects being stored in the object storage means 7, produces digital image data in which the digital image data of the source object a3 of the pair of objects is altered in accordance with image attribute information of the destination object a5 of the pair of objects, and alters the destination object a5 by means of applying information as to a storage destination of the digital image data thus produced to the destination object a5 of the pair of objects. Repeating this alteration makes it possible convert all the digital image data of interest of conversion into digital image data of 320 pixels×240 pixels. Next, the process goes to step S408.

In the step S408, the object deleting means 4 deletes the route object a1. In accordance with deletion of the route object a1, the route source object a2, the source objects a3, the route destination object a4 and the destination objects a5 are deleted.

In this manner, according to the image processing apparatus of the present embodiment, it is possible to efficiently perform a conversion processing for a plurality of digital image data, dealing with the digital image data in unit of an object and utilizing parentage of objects and succession of property by a class.

As mentioned above, according to the image processing apparatus and the program storage medium of the present invention, it is possible to efficiently perform a processing for image data, utilizing parentage of objects and succession of property by a class.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. An image processing apparatus for dealing with objects in an object system consisting of a plurality of objects each having a pair of image data representative of an image and image attribute information representative of an attribute of the image, said image processing apparatus comprising:

object deriving means for deriving image attribute information representative of the attribute of the image for linking the plurality of objects, the derived attribute information including image format data representative of the image;

object linking means for linking the plurality of objects in form of a hierarchy structure including parentage; and object producing means for producing new objects, wherein when said object producing means produces new objects having a parent object, said object producing means sets up image attribute information including the image format data of the parent object on the new objects now on production in form of a default.

2. An image processing apparatus for dealing with objects in an object system consisting of a plurality of objects each having a pair of image data representative of an image and image attribute information representative of an attribute of the image, said image processing apparatus comprising:

object deriving means for deriving image attribute information representative of the attribute of the image for linking the plurality of objects, the derived attribute information including image format data representative of the image;

object linking means for linking the plurality of objects in form of a hierarchy structure including parentage; and attribute altering means for altering image attribute information including the image format data of existing objects, wherein when said attribute altering means alters image attribute information including the image format data of an object having a descendant object, said attribute altering means causes image attribute information including the image format data altered in image attribute information of an object to be altered to be reflected in the descendant object of the object to be altered.

3. An image processing apparatus for dealing with objects in an object system consisting of a plurality of objects each having a pair of image data representative of an image and image attribute information representative of an attribute of the image, said image processing apparatus comprising:

object deriving means for deriving image attribute information representative of the attribute of the image for linking the plurality of objects, the derived attribute information including image format data representative of the image;

object linking means for linking the plurality of objects in form of a hierarchy structure including parentage; and object deleting means for deleting existing objects, wherein when said object deleting means deletes an object having descendant objects, said object deleting means deletes also the descendant objects of an object to be deleted.

4. An image processing apparatus for performing an image processing including a production processing for an object having a pair of image data representative of an image and image attribute information representative of an attribute of the image, said image processing apparatus comprising:

object deriving means for deriving image attribute information representative of the attribute of the image for linking a plurality of objects, the derived attribute information including image format data representative of the image;

storage means for storing image attribute information including the image format data for a default, where the plurality of objects of the image and the image attribute information including the image format data are linked in form of a hierarchy structure including parentage; and object producing means for producing objects, wherein said object producing means sets up image attribute information including the image format data stored in said storage means on an object now on production in form of a default.

5. An image processing apparatus according to claim 1, wherein said image processing apparatus deals with a medical image, and the image attribute information includes patient information and photographic condition.

6. An image processing apparatus according to claim 2, wherein said image processing apparatus deals with a medical image, and the image attribute information includes patient information and photographic condition.

7. An image processing apparatus according to claim 3, wherein said image processing apparatus deals with a medical image, and the image attribute information includes patient information and photographic condition.

8. An image processing apparatus according to claim 4, wherein said image processing apparatus deals with a medical image, and the image attribute information includes patient information and photographic condition.

9. A program storage medium loaded onto a computer system for storing an image processing program for causing said computer system to operate as an image processing apparatus for dealing with objects in an object system consisting of a plurality of objects each having a pair of image data representative of an image and image attribute information representative of an attribute of the image, said image processing program comprising:

object deriving means for deriving image attribute information representative of the attribute of the image for linking the plurality of objects, the derived attribute information including image format data representative of the image;

object linking means for linking the plurality of objects in form of a hierarchy structure including parentage, and object producing means for producing new objects, wherein when said object producing means produces new objects having a parent object, said object producing means sets up image attribute information including the image format data of the parent object on the new objects now on production in form of a default.

10. A program storage medium loaded onto a computer system for storing an image processing program for causing said computer system to operate as an image processing apparatus for dealing with objects in an object system consisting of a plurality of objects each having a pair of image data representative of an image and image attribute information representative of an attribute of the image, said image processing program comprising:

object deriving means for deriving image attribute information representative of the attribute of the image for linking the plurality of objects, the derived attribute information including image format data representative of the image;

object linking means for linking the plurality of objects in form of a hierarchy structure including parentage, and attribute altering means for altering image attribute information including the image format data of existing objects, wherein when said attribute altering means alters image attribute information including the image format data of an object having a descendant object, said attribute altering means causes image attribute information including the image format data altered in image attribute information including the image format data of an object to be altered to be reflected in the descendant object of the object to be altered.

11. A program storage medium loaded onto a computer system for storing an image processing program for causing said computer system to operate as an image processing apparatus for dealing with objects in an object system consisting of a plurality of objects each having a pair of image data representative of an image and image attribute information representative of an attribute of the image, said image processing program comprising:

object deriving means for deriving image attribute information representative of the attribute of the image for linking the plurality of objects, the derived attribute information including image format data representative of the image;

object linking means for linking the plurality of objects in form of a hierarchy structure including parentage, and object deleting means for deleting existing objects, wherein when said object deleting means deletes an object having descendant objects, said object deleting means deletes also the descendant objects of an object to be deleted.

12. A program storage medium loaded onto a computer system for storing an image processing program for causing said computer system to operate as an image processing apparatus for dealing with objects in an object system consisting of a plurality of objects each having a pair of image data representative of an image and image attribute information representative of an attribute of the image, said image processing program comprising:

object deriving means for deriving image attribute information representative of the attribute of the image for linking the plurality of objects, the derived attribute information including image format data representative of the image;

object linking means for linking the plurality of objects in form of a hierarchy structure including parentage, and object producing means for producing objects, wherein said object producing means sets up a predetermined image attribute information including the image format data on an object now on production in form of a default.

13. A program storage medium according to claim 9, wherein said image processing program deals with a medical image, and the image attribute information includes patient information and photographic condition.

14. A program storage medium according to claim 10, wherein said image processing program deals with a medical image, and the image attribute information includes patient information and photographic condition.

15. A program storage medium according to claim 11, wherein said image processing program deals with a medical image, and the image attribute information includes patient information and photographic condition.

16. A program storage medium according to claim 12, wherein said image processing program deals with a medical image, and the image attribute information includes patient information and photographic condition.

\* \* \* \* \*

UNITED STATES PATENT AND TRADEMARK OFFICE
CERTIFICATE OF CORRECTION

PATENT NO. : 6,968,077 B1  
APPLICATION NO. : 09/495931  
DATED : November 22, 2005  
INVENTOR(S) : Takatoshi Yamanaka Page 1 of 1

It is certified that error appears in the above-identified patent and that said Letters Patent is hereby corrected as shown below:

On Title page, #56 references cited column 2, eighth reference, change "Tipimeni" to --Tipirneni--.

Signed and Sealed this

Eleventh Day of July, 2006

JON W. DUDAS  
*Director of the United States Patent and Trademark Office*